(12) United States Patent
LeBlanc et al.

(10) Patent No.: US 8,973,677 B2
(45) Date of Patent: *Mar. 10, 2015

(54) HOUSING, MANDREL AND BEARING ASSEMBLY POSITIONABLE IN A WELLBORE

(71) Applicant: Coiled Tubing Rental Tools, Inc., Lafayette, LA (US)

(72) Inventors: Randall C. LeBlanc, Lafayette, LA (US); Carl S. LeBlanc, Lafayette, LA (US)

(73) Assignee: Coiled Tubing Rental Tools, Inc., Lafayette, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,820

(22) Filed: Oct. 27, 2014

(65) Prior Publication Data

US 2015/0041219 A1 Feb. 12, 2015

Related U.S. Application Data

(63) Continuation of application No. 13/166,080, filed on Jun. 22, 2011, now Pat. No. 8,869,917.

(51) Int. Cl.
*E21B 4/02* (2006.01)
*F16C 19/30* (2006.01)
(Continued)

(52) U.S. Cl.
CPC . *E21B 4/00* (2013.01); *E21B 4/003* (2013.01); *E21B 10/00* (2013.01)
USPC .............................. 175/207; 175/228; 384/94

(58) Field of Classification Search
CPC .................................... E21B 4/00; E21B 4/02
USPC .......................... 175/107, 228; 384/93, 94, 97
See application file for complete search history.

(56) References Cited

U.S. PATENT DOCUMENTS

| 771,626 A | 10/1904 | Gilman |
| 3,840,080 A | 10/1974 | Berryman |
| 3,986,570 A | 10/1976 | Stinson et al. |

(Continued)

FOREIGN PATENT DOCUMENTS

| CA | 2058080 | 11/1997 |
| DE | 40 32 064 A1 | 4/1992 |

(Continued)

OTHER PUBLICATIONS

Authorized officer Nathalie Kermani, International Search Report/Written Opinion in PCT/US2009/052445, mailed Feb. 25, 2010, 13 pages.

(Continued)

*Primary Examiner* — William P Neuder
(74) *Attorney, Agent, or Firm* — Fish & Richardson P.C.

(57) ABSTRACT

A housing, mandrel and bearing assembly positionable in a wellbore includes a torque transmission member adapted to connect to a source of rotational torque (e.g. a downhole motor power output) and a tubular mandrel adapted to connect to a drill bit. A lower tubular housing is adapted to contain a lower bearing and catch sleeve assembly. The catch assembly is adapted to retain the mandrel in the lower housing if the mandrel breaks. An upper tubular housing contains an upper bearing and is adapted to connect to a housing of the downhole motor. A method of assembling the downhole housing, mandrel and bearing assembly is disclosed.

26 Claims, 15 Drawing Sheets

(51) Int. Cl.
*E21B 4/00* (2006.01)
*E21B 10/00* (2006.01)

(56) References Cited

U.S. PATENT DOCUMENTS

| | | | |
|---|---|---|---|
| 4,246,976 A | 1/1981 | McDonald, Jr. | |
| 4,368,789 A | 1/1983 | Orr et al. | |
| 4,492,276 A | 1/1985 | Kamp | |
| 4,772,246 A | 9/1988 | Wenzel | |
| 5,000,723 A | 3/1991 | Livingstone | |
| 5,090,497 A | 2/1992 | Beimgraben et al. | |
| 5,205,789 A | 4/1993 | Falgout, Sr. | |
| 5,267,905 A | 12/1993 | Wenzel et al. | |
| 5,495,900 A | 3/1996 | Falgout, Sr. | |
| 5,547,229 A | 8/1996 | Eidsmore | |
| 5,588,818 A | 12/1996 | Houmand et al. | |
| 5,651,737 A | 7/1997 | Le Blanc | |
| 5,704,838 A | 1/1998 | Teale | |
| 6,073,708 A | 6/2000 | Brown et al. | |
| 6,116,658 A | 9/2000 | Bohlen | |
| 6,183,226 B1 | 2/2001 | Wood et al. | |
| 6,202,762 B1 | 3/2001 | Fehr et al. | |
| 6,203,435 B1 | 3/2001 | Falgout, Sr. | |
| 6,328,119 B1 | 12/2001 | Gillis et al. | |
| 6,709,234 B2 | 3/2004 | Gilbert et al. | |
| 6,827,160 B2 | 12/2004 | Blair et al. | |
| 6,860,514 B2 | 3/2005 | Wentworth et al. | |
| 6,905,319 B2 | 6/2005 | Guo | |
| 6,945,338 B1 | 9/2005 | Defourny et al. | |
| 6,949,025 B1 | 9/2005 | Kraus et al. | |
| 7,004,843 B1 | 2/2006 | Kerstetter | |
| 7,186,182 B2 | 3/2007 | Wenzel et al. | |
| 7,549,487 B2 | 6/2009 | LeBlanc et al. | |
| 7,624,819 B1 | 12/2009 | LeBlanc et al. | |
| 8,869,917 B2 * | 10/2014 | LeBlanc et al. | 175/207 |
| 2002/0092682 A1 | 7/2002 | Blair et al. | |
| 2003/0181245 A1 | 9/2003 | Shaw | |
| 2005/0072602 A1 | 4/2005 | Pascale et al. | |
| 2008/0029304 A1 | 2/2008 | LeBlanc et al. | |
| 2008/0135304 A1 | 6/2008 | Duggan et al. | |
| 2008/0217062 A1 * | 9/2008 | Southard | 175/57 |

FOREIGN PATENT DOCUMENTS

| | | |
|---|---|---|
| DE | 195 27 990 C1 | 8/1996 |
| DE | 200 12 524 U1 | 9/2000 |
| DE | 10 2006 022613 B4 | 11/2007 |
| GB | 2 354 300 | 3/2001 |
| JP | H05-141172 | 6/1993 |

OTHER PUBLICATIONS

Authorized officer Yannick Gouby, International Search Report/Written Opinion in PCT/US2009/054065, mailed Nov. 11, 2010, 13 pages.

Authorized officer Simin Baharlou, International Preliminary Report on Patentability in PCT/US2009/054065, mailed Mar. 3, 2011, 7 pages.

Authorized officer Jean-Marie Bouvet, Communication Relating to the Results of the Partial International Search in International Application No. PCT/US2012/037976, mailed May 17, 2013, 4 pages.

Authorized officer Adri Schouten, International Search Report and Written Opinion of the International Searching Authority, PCT/US2012/037976, mailed Sep. 9, 2013, 16 pages.

Authorized Officer Philippe Becamel, International Preliminary Report on Patentability, PCT/US2012/037976, mailed Jan. 9, 2014.

* cited by examiner

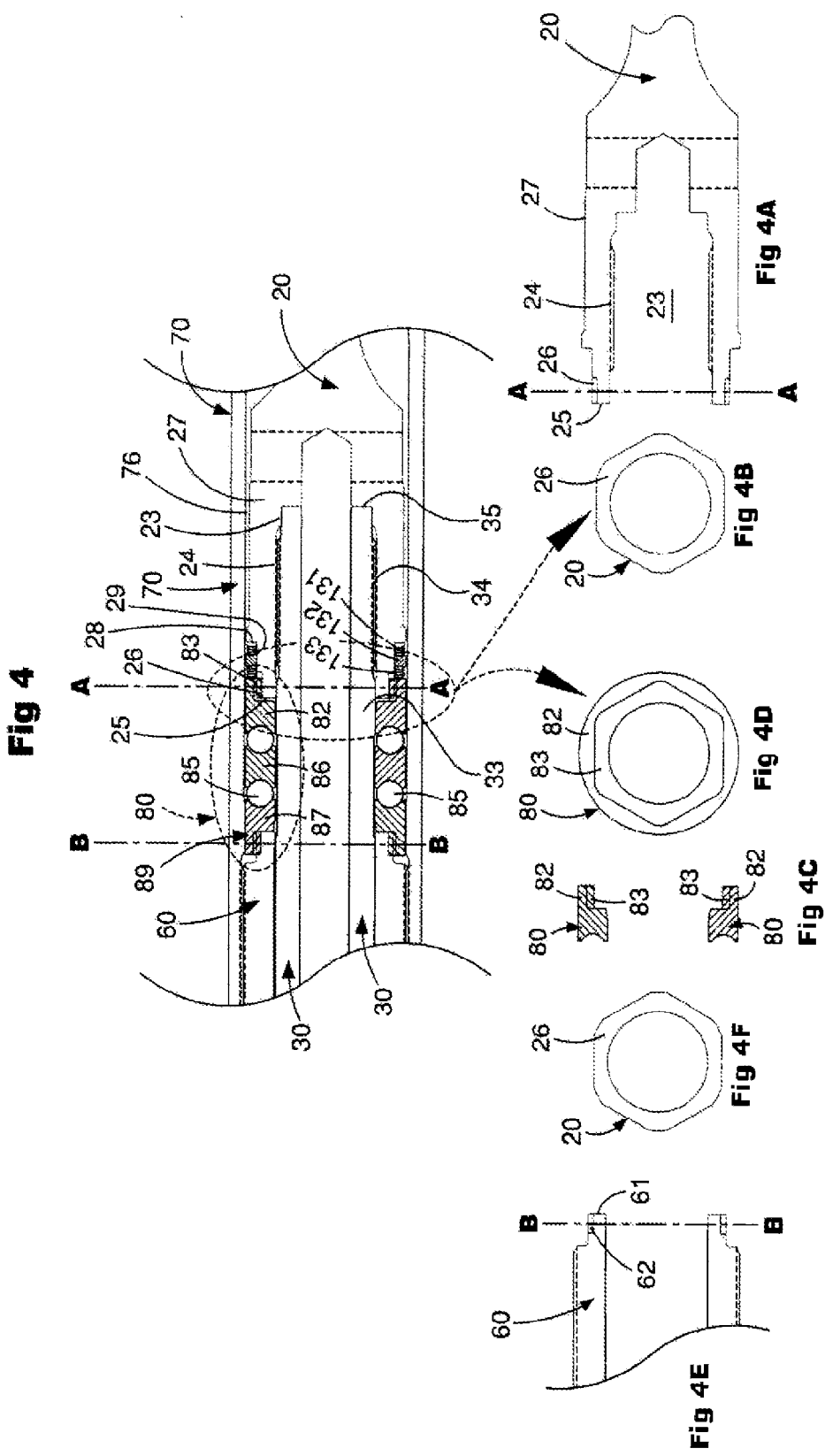

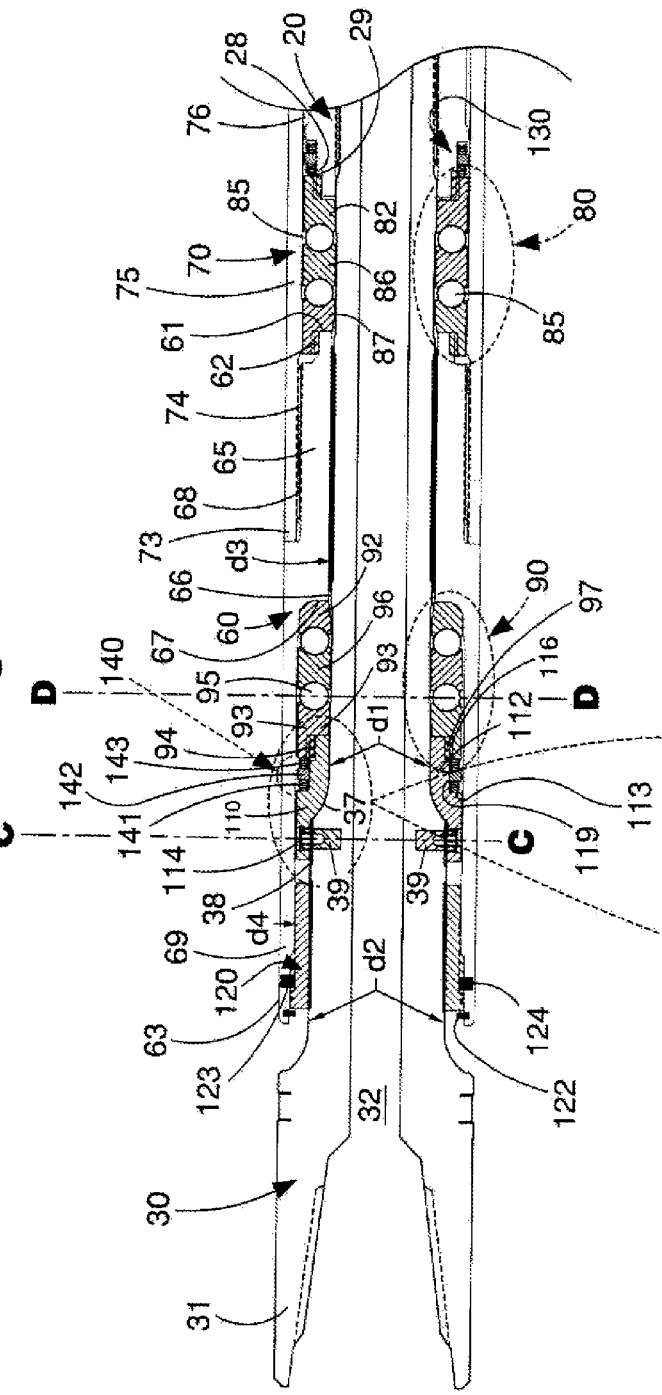

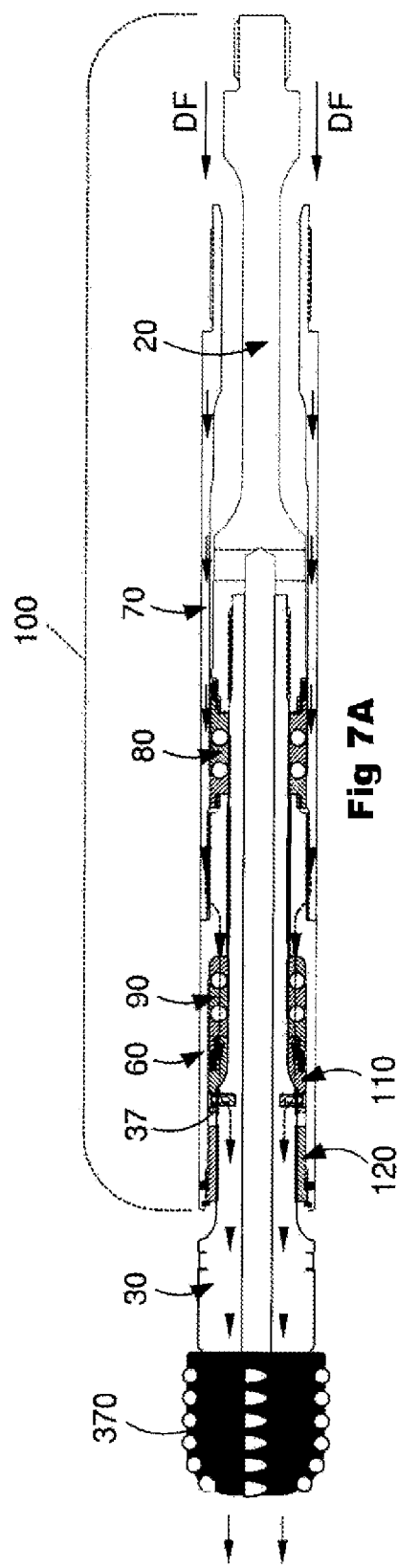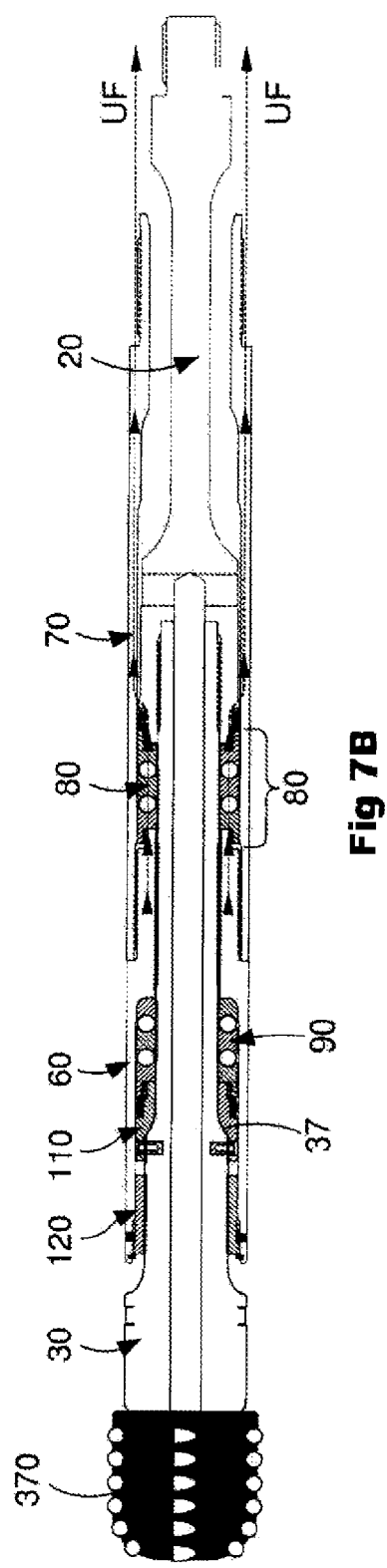

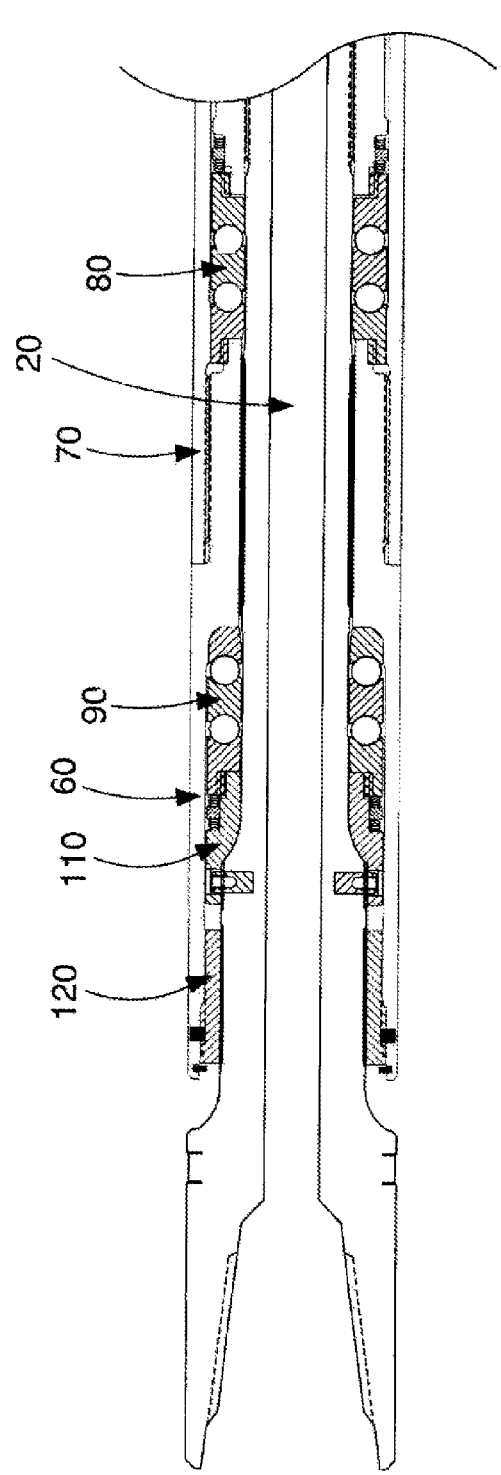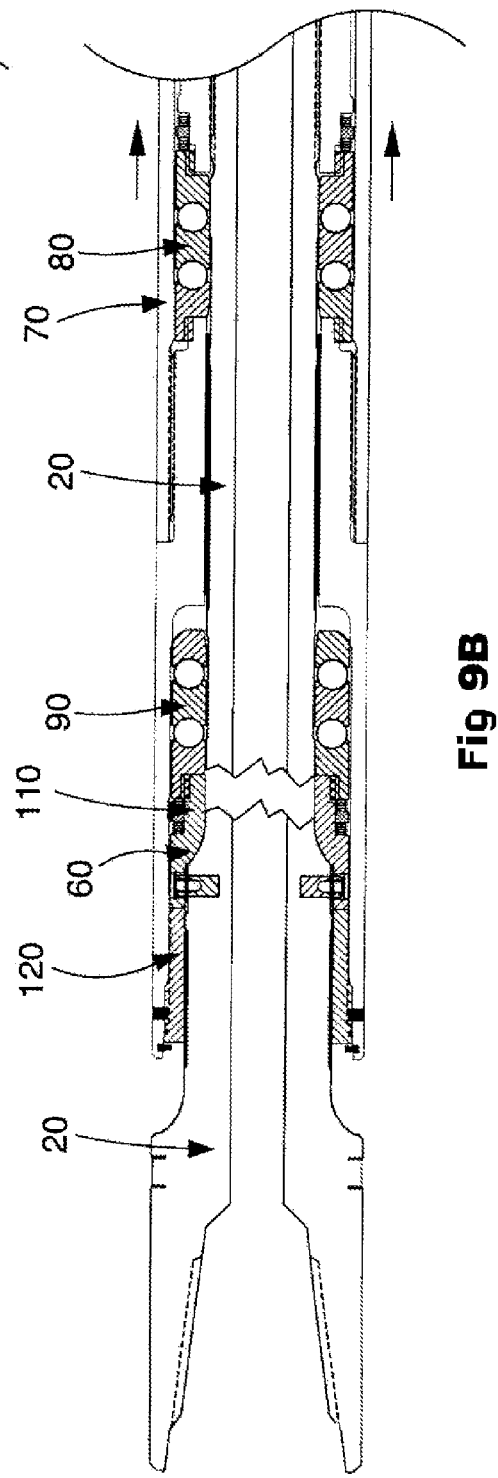

HOUSING, MANDREL AND BEARING ASSEMBLY POSITIONABLE IN A WELLBORE

CLAIM OF PRIORITY

This application is a continuation of and claims the benefit of priority to U.S. application Ser. No. 13/166,080, filed Jun. 22, 2011, incorporated herein by reference.

TECHNICAL FIELD

The present invention relates generally to improvements in downhole drilling equipment and more particularly pertains to a new improved housing, mandrel and bearing assembly for transmitting power from a downhole drilling motor output to a drill bit.

BACKGROUND

Downhole drilling motors have been used for many years in the drilling of oil and gas wells and other wells. In the usual mode of operation, the rotational power output shaft of the motor and the drill bit will rotate with respect to the housing of the motor. The housing, in turn, is connected to a conventional drill string composed of drill collars and sections of drill pipe. This drill string extends to the surface. Drilling fluid is pumped down through the drill string to the bottom of the hole and back up the annulus between the drill string and the wall of the bore hole. The drilling fluid cools the drill bit and removes the cuttings resulting from the drilling operation. In the instances where the downhole drilling motor is a hydraulic powered type, such as a positive displacement type motor, the drilling fluid also supplies the hydraulic power to operate the motor. See FIG. 1.

Virtually all downhole drilling motors have three basic components:
1. Motor section
2. Vertical thrust bearings
3. Radial bearings The bearings can be placed in a separate package or unit at the motor section and thus can be used on any type of motor (i.e., turbodrills, positive displacement motors, etc.).

There are two basic types of downhole drilling motors:
1. Turbodrills
2. Positive displacement motors.

Turbodrills utilize the momentum change of drilling fluid (i.e., mud) passing through curved turbine blades to provide power to turn the bit. Turbodrills turn at speeds of 600 to 3,000 rpm. Positive displacement motors have fixed volumetric displacement and their speed is directly proportional to the flow rate of the hydraulic power fluid.

There are two basic types of positive displacement motors in use:
1. Moineau motors have a helical rotor within the cavity of a stator which is connected to the housing of the motor. As the drilling fluid is pumped down through the motor, the fluid rotates the rotor.
2. Vane motors have large volumetric displacement and therefore deliver higher torques at lower speeds.

Thrust bearing failure in downhole motors is a problem because of high dynamic loads produced by the action of the bits and by drill string vibrations. One major oil company placed a recorder at the hole bottom and found that dynamic loads were often 50% higher than the applied bit weight. It was found on occasion that the bit bounced off the bottom and produced loads in excess of 120,000 pounds when drilling at an applied bit weight of 40,000 pounds. See discussion in U.S. Pat. No. 4,246,976, incorporated by reference. These high loads can cause rapid failure of the thrust bearings and bearing mandrels; consequently, these bearings must be greatly over-designed to operate in the hostile downhole environment.

At least three types of thrust bearings have been used in downhole drilling motors:
1. Rubber friction bearings
2. Ball or roller bearings
3. PDC Diamond Bearings.

Radial bearings are required between the bearing housing and the rotating mandrel transmitting power from the motor power output to the bit. Radial bearings are usually subjected to lower loads than the thrust bearings and therefore have much longer life. The basic types of radial bearings used in downhole motors are:
1. Marine bearings
2. Roller or ball bearings
3. Metal to metal carbide bearings.

Most motors contain metal to metal radial bearings. These bearings are frequently lubricated by circulating mud through them. However, some bearing systems are sealed and are lubricated using lubricant (grease/oil) injected into the bearing by a hydraulic piston assembly.

For a further discussion of downhole drilling motors and their operations, see U.S. Pat. Nos. 3,840,080; 4,246,976; 4,492,276; 5,495,900; 5,090,497; 6,183,226; 6,905,319 and Canadian Patent No. 2,058,080, incorporated by reference.

SUMMARY

The present disclosure pertains to a new improved housing, mandrel and bearing assembly for transmitting power from a source of rotational torque (e.g. a downhole drilling motor output) to the drill bit. Rotational power=torque×RPM/5250. The invention provides a reduced length housing, bearing and mandrel assembly used in downhole drilling operations.

Reduced length provides the following advantages: Ability to more effectively navigate around deviated sections of the wellbore by reducing friction caused as a section of the bottom hole assembly goes in and out of these deviated sections, which ultimately causes premature wear on internal components. Secondly, a reduced bit to bend allows the drill motor to build greater angle with less of an incorporated fix bend to get to desired lateral. This reduced degree bent housing ultimately reduces wear and tear on internal components.

As used in this document, "tubular" refers to a generally cylindrical member with a longitudinal passage therethrough. The longitudinal passage may be formed therein or bored therethrough.

A housing, mandrel and bearing assembly postionable in a wellbore is disclosed herein. In some implementations the assembly includes a torque transmission member (e.g. a flex shaft) having an upper end adapted to receive rotational torque power (e.g. from a downhole motor power output), a lower portion with a longitudinal cavity with an open lower end, at least a portion of said cavity having an internal connector, and a lower end having an external connector. The assembly further includes a tubular mandrel adapted at a lower end to connect to a drill bit, said tubular mandrel having an upper portion of the tubular mandrel with an external surface including a connector adapted to connect to the internal connector in the longitudinal cavity of the torque transmission member, a longitudinal passage through the mandrel from an upper end to the lower end, a shoulder disposed on a portion of the external surface of the tubular mandrel between the upper portion of the tubular mandrel and a lower portion of the tubular mandrel, said upper portion having a first outside diameter d1 and said lower portion having a second outside diameter d2, wherein the second outside diameter d2 is greater than the first outside diameter d1. The assembly further includes a lower tubular housing having a longitudinal passage from an upper end of the lower tubular housing to a lower end of the lower tubular housing, an upper portion having a connector, a shoulder disposed between the upper portion of the lower tubular housing and a lower portion of the lower tubular housing, said upper portion having a first inside diameter d3 and said lower portion having a second inside diameter d4, wherein the second inside diameter d4 is greater than the first inside diameter d3. The assembly further includes an upper tubular housing having a longitudinal passage from an upper end of the upper tubular housing to a lower end of the upper tubular housing, said longitudinal passage having a lower portion with an internal diameter adapted to receive an upper bearing, said lower portion of the longitudinal passage adapted to connect to the connector on the upper portion of the lower tubular housing. An upper bearing disposed in the longitudinal passage of the upper tubular housing contacting the lower end of the torque transmission member and a lower bearing disposed in the longitudinal passage of the lower tubular housing contacting the shoulder of the lower tubular housing. It will be understood by those skilled in the art that various types of thrust bearings and radial bearings, as known in the art, may be used in the practice of this invention.

In some implementations the lower tubular housing has a longitudinal passage from an upper end of the lower tubular housing to a lower end of the lower tubular housing and an upper portion having a connector. The assembly further includes an upper tubular housing having a longitudinal passage from an upper end of the upper tubular housing to a lower end of the upper tubular housing, said longitudinal passage having a lower portion with an internal diameter adapted to receive an upper bearing, said lower portion of the longitudinal passage adapted to connect to the connector on the upper portion of the lower tubular housing. An upper bearing disposed in the longitudinal passage of the upper tubular housing contacting the lower end of the torque transmission member and a lower bearing disposed on the tubular mandrel and contacting the lower tubular housing. It will be understood by those skilled in the art that various types of thrust bearings and radial bearings, as known in the art, may be used in the practice of this invention In some implementations the assembly may further include an upper preload spring(s) adapted to keep the upper bearing in compression and a lower preload spring(s) adapted to keep the lower bearing in compression.

In some implementations, the assembly may include a tubular catch sleeve disposed on a lower portion of the tubular mandrel. The tubular catch sleeve having an internal passageway adapted to contact the shoulder of the tubular mandrel and an exterior surface adapted to be received in the longitudinal passage of the lower housing. The tubular catch sleeve further includes an upper end having a connector adapted to connect to the lower bearing and a portion of the internal passageway in the tubular catch sleeve having a connector adapted to connect to a connector on a portion of the tubular mandrel. The connector in the internal passageway of the tubular catch sleeve is selected from the group consisting of hex, threaded, spline or pin connectors.

In some implementations the downhole housing, mandrel and bearing assembly may further include at least one radial receptacle disposed in the lower portion of the tubular mandrel for receiving a locking pin to secure the tubular catch sleeve to the tubular mandrel.

The assembly may further include a radial sleeve (e.g. radial bearing) disposed in the lower end of the lower housing around the tubular mandrel and a retaining member that retains the radial sleeve in the lower tubular housing, wherein an upper end of said radial sleeve is adapted to abut a lower end of the tubular catch sleeve when during drilling operations in a wellbore the tubular mandrel shears into an upper and lower portion, and the lower portion of the tubular mandrel is removed with the lower housing from the wellbore.

As noted above, various types of radial and thrust bearings known in the art may be used in the practice of this invention. In some implementations the upper bearing comprises at least an upper race member, a lower race member, and a plurality of thrust balls disposed there between, wherein the upper race member has an upper end adapted to contact the torque transmission member (e.g. flex shaft) thereby securing the upper race to the torque transmission member such that the upper race member rotates with the torque transmission member when the torque transmission member and the tubular mandrel are rotated during drilling operations. The lower race member has a lower end adapted to contact an upper end of the lower tubular housing thereby securing the lower race to the lower tubular housing when the torque transmission member and the tubular mandrel are rotated during drilling operations.

As noted above, various types of radial and thrust bearings known in the art may be used in the practice of this invention. In some implementations, the lower bearing comprises at least an upper race member, a lower race member, and a plurality of thrust balls disposed there between, wherein the lower race member of the lower bearing has a lower end that is adapted to contact the upper end of the catch assembly, thereby securing the lower race member to the tubular catch sleeve as the torque transmission member and the tubular mandrel are rotated during drilling operations. The upper race member of the lower bearing is adapted to contact the shoulder in the lower housing thereby securing the upper race member to the lower housing as the torque transmission member and the tubular mandrel are rotated during drilling operations.

A method of assembling the downhole drilling assembly is disclosed. The method may include providing a tubular mandrel having a bit box at a lower end adapted to connect to a drill bit, said tubular mandrel having an upper portion of the tubular mandrel having a connector adapted to connect a rotatable torque transmission member to a source of rotational torque, a shoulder is disposed on a portion of the tubular mandrel between the upper portion of the tubular mandrel and a lower portion of the tubular mandrel. A radial sleeve is provided and slid over the tubular mandrel from the top and down over the mandrel until the radial sleeve is proximal to the upper end of the bit box. A tubular catch sleeve is then slid over the top of the tubular mandrel and down over the mandrel until a lower connector disposed in an internal passageway through the tubular catch sleeve and is positioned in contact with a connector of the mandrel, such that the tubular catch sleeve abuts the shoulder of the tubular mandrel and the tubular catch sleeve is secured to the tubular mandrel. A lower bearing is then slide over the tubular mandrel and positioned on a top of the tubular catch sleeve.

A lower tubular housing is slid over the tubular mandrel and positioned such that a shoulder of the lower tubular housing contacts the upper end of the lower bearing. An upper bearing is then slid over the mandrel and positioned in contact with the lower tubular housing. A longitudinal cavity in a lower portion of a torque transmission member is positioned over the upper end of the tubular mandrel and connects the torque transmission member to the upper end of the tubular mandrel. An upper tubular housing is positioned over the torque transmission member and the upper tubular housing is connected to the lower tubular housing.

In some implementations, before sliding the radial sleeve over the tubular mandrel, a retaining member is slid downwardly from the upper end of the tubular mandrel until it is proximal to an outer radius of the bit box at the lower end of the mandrel. Then the radial sleeve is slid over the tubular mandrel from the top until it is proximal to the retaining member and the retaining member is inserted into the lower end of the lower housing after sliding the lower tubular housing over the tubular mandrel. The retaining member is adapted to prevent the radial sleeve from sliding out the lower end of the lower tubular housing. Alternatively, after sliding the lower tubular housing over the tubular mandrel the retaining member (e.g. a split retaining ring) is inserted in a lower end of the lower tubular housing.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A is a cross-section of the bearing mandrel of the prior art assembly of FIG. 2.

FIG. 4 is an enlarged cross-section of an upper portion of the assembly of FIG. 3.

FIG. 4A is a cross-section illustrating a portion of a flex shaft of the assembly of FIG. 4.

FIG. 4B is a lateral cross-section of the flex shaft of FIG. 4A taken at section AA.

FIG. 4C is a cross-section of a bearing assembly member of FIG. 4.

FIG. 4D is a lateral cross-section of an upper end of the bearing assembly member of FIG. 4 taken at Section AA.

FIG. 4E is a cross-section of the upper end of the lower housing of FIG. 4.

FIG. 4F is a lateral cross-section of the upper end of the lower housing of FIG. 4 taken at section BB.

FIG. 5 is a cross-section of a lower portion of the assembly of FIG. 3.

FIG. 5A is a cross-section illustrating a portion of a tubular mandrel and a catch assembly of FIG. 5.

FIG. 5B is a lateral cross-section of the tubular mandrel and the catch assembly of FIG. 5A taken at section CC of FIG. 5.

FIGS. 7A and 7B are a cross-section illustrating the transfer of downward force and upward force from a drill string through the assembly of FIG. 3 to a drill bit.

FIGS. 9A and 9B are a cross-section illustrating the assembly of FIG. 3 before failure of the mandrel and after failure of the mandrel, wherein the catch sleeve and radial sleeve maintain the broken mandrel in the assembly.

Like reference symbols in the various drawings indicate like elements.

DETAILED DESCRIPTION

Figure 1:
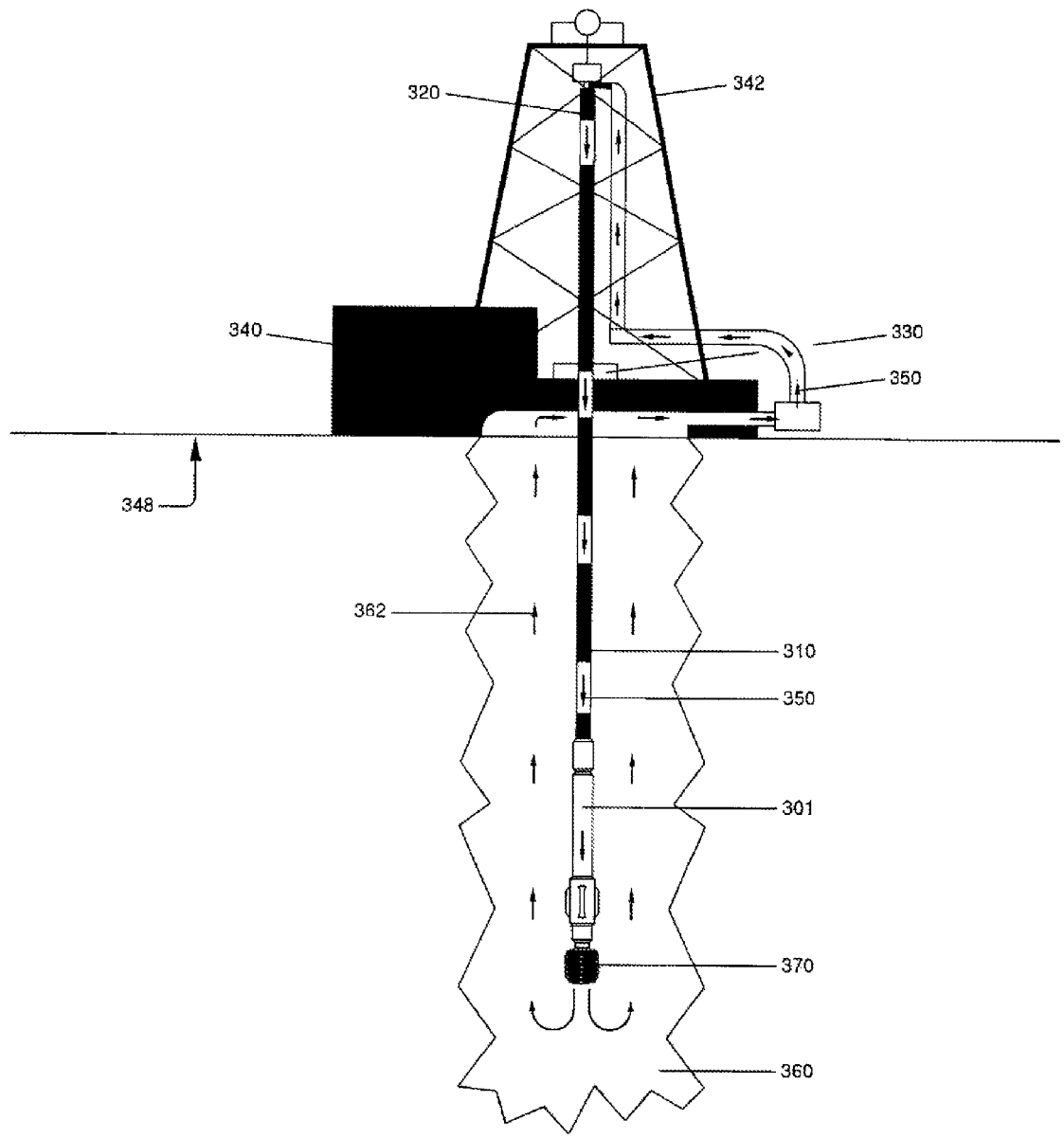
FIG. 1 is a schematic illustrating a typical drilling system using a downhole drilling motor assembly.

FIG. 1 illustrates a simplified schematic of a drilling operation. A drill string 310 extends to the surface 348 where it is connected to a kelly 320, mounted in a rotary table 330 of a drilling rig 340 to provide rotation to the drill string 310 when a downhole motor is not used to provide rotation to the bit. Alternatively, top drive systems are suspended in a rig derrick 342 and provide rotation directly to the drill string 310. Drilling fluid 350 is pumped down through the drill string 310 to the bottom of the bore hole 360 and back up the annulus 362 between the drill string 310 and the wall of the bore hole 360. The drilling fluid cools the drill bit 370 and removes the cuttings resulting from the drilling operation.

In certain drilling situations, including but not limited to directional drilling, it is useful to use a downhole drilling motor assembly 301 to provide rotation to the bit. In such situations the downhole motor assembly 301 is inserted into the drill string 310 above the drill bit 370. In the instances where the downhole drilling motor is a hydraulic type, such as a progressive cavity type motor, the drilling fluid 350 also supplies the hydraulic power to operate the motor.

Various types of downhole drilling motors may be employed for the purpose of the invention such as electrical motors and hydraulic motors. Suitable hydraulic motors are turbines, vane motors and Moineau motors. See discussion in background section of this document about various types of drilling motors.

A Moineau motor is very useful for application in the present invention since this type of motor is provided with a flexible connection between the rotor and power output shaft to compensate the eccentric movement of the rotor in the housing during operation of the motor. The invention is not restricted to the use of a Moineau motor. Any type of downhole motor known in the art may be used with the bearing mandrel and bearing assembly of the present invention.

Figure 2:
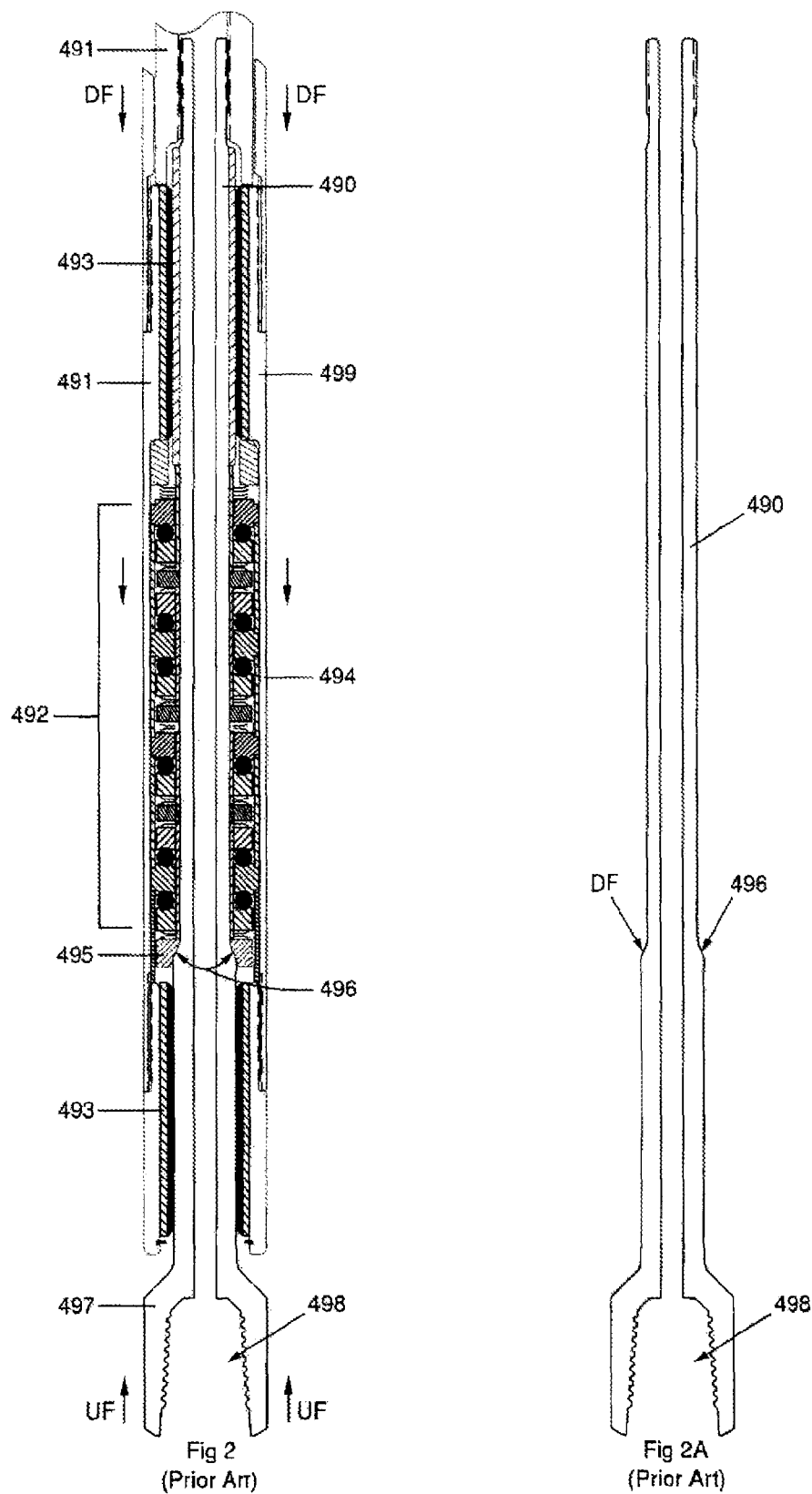
FIG. 2 is a cross-section of a prior art bearing and bearing mandrel assembly of a prior art downhole motor.

FIG. 2 illustrates a partial cross-section of a prior art downhole motor bearing assembly and bearing mandrel assembly. A downhole drilling motor (not shown) transmits power from the motor power output 491 to a bearing mandrel 490 that contacts radial bearings 493 and thrust bearings 492 housed in a bearing housing 494. The mandrel's distal (lower) end 497 includes a bit box 498 connection for connection to a drill bit. The box connection results in assembly configurations that does not allow the mandrel to be assembled by insertion of the mandrel through the proximal (upper end) 499 of the bearing housing 494. These prior art configurations have mandrels with stepped down profiles 496 on which a bearing spacer 495 makes contact. FIG. 2A illustrates one embodiment of a cross-section of the prior art bearing mandrel 490.

As weight is applied on the bit, a downward force DF will move down the drill string through the motor and to the mandrel 490. As the mandrel 490 moves downward, bearing spacer 491 will push thrust bearings 492 down. Bearing spacer 495 will contact mandrel 490 at the step down 496. When it does, it will provide weight to the bit to start drilling. An equal and opposite upward force UF will be exerted by the bottom of the bore hole below the bit.

Figure 3:
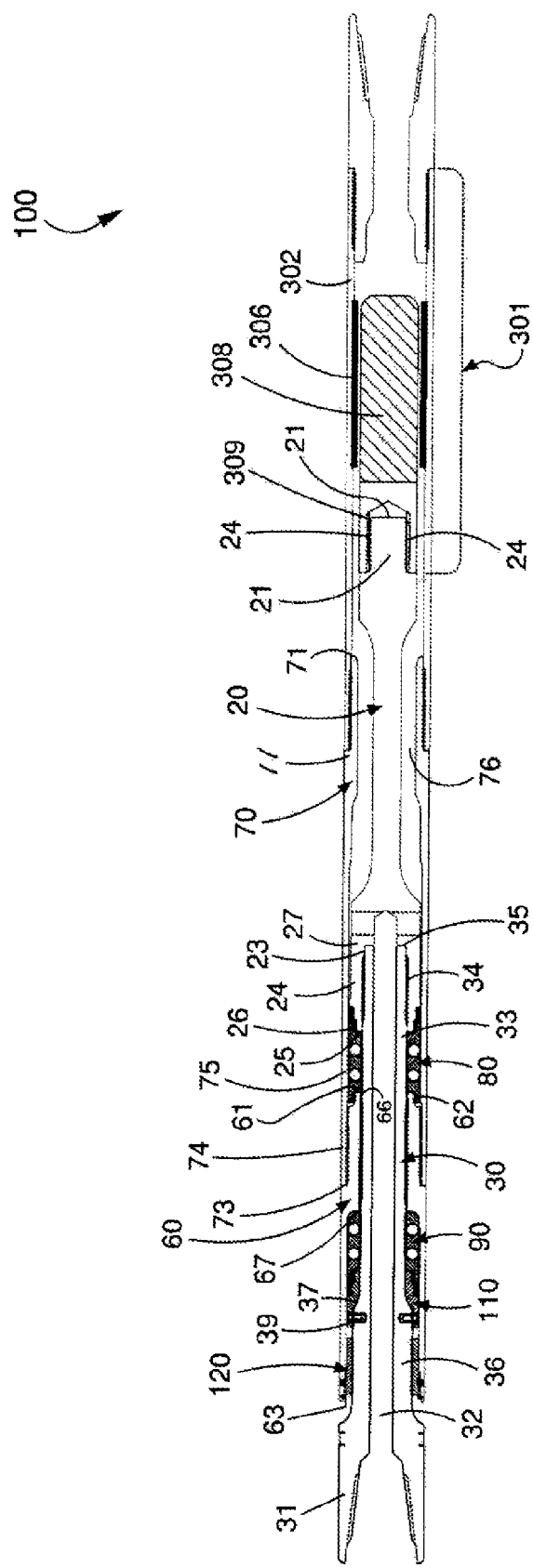
FIG. 3 is a cross-section of a housing, mandrel and bearing assembly of the present disclosure.
Figure 5D:
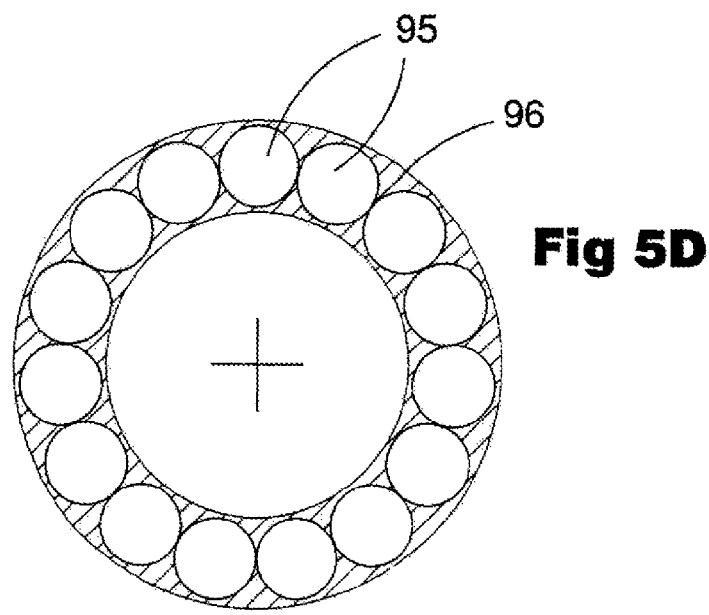
FIG. 5D is a lateral cross-section of the lower bearing assembly of FIG. 5 taken at section DD.
Figure 5C:
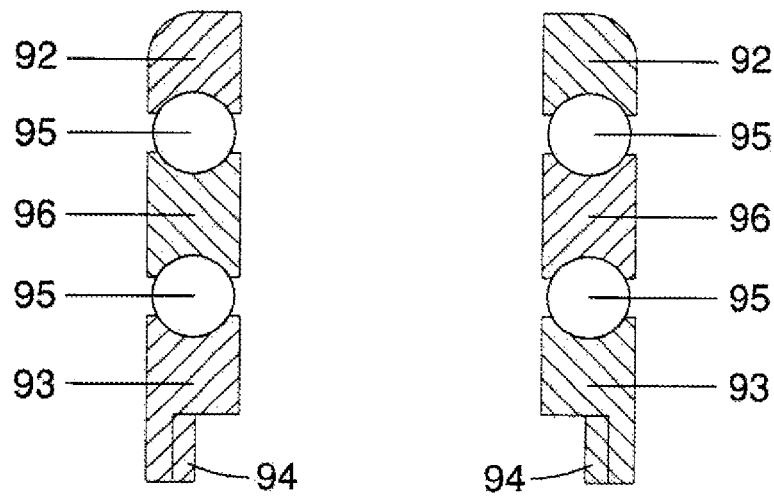
FIG. 5C is a cross-section of a lower bearing assembly of FIG. 5.

FIG. 3 illustrates a partial cross-section of a downhole motor assembly 301 that includes a tubular housing 302 that is preferably formed of steel. Disposed within the tubular housing 302 is a power unit having a stator 306 and a rotor 308 connected to a power output assembly 309. The power output assembly 309 may be attached directly to the housing, mandrel and bearing assembly 100 according to one embodiment of the present invention or may include intermediate assemblies that ultimately connect to the housing, mandrel and bearing assembly 100 of the present invention.

Figure 6:
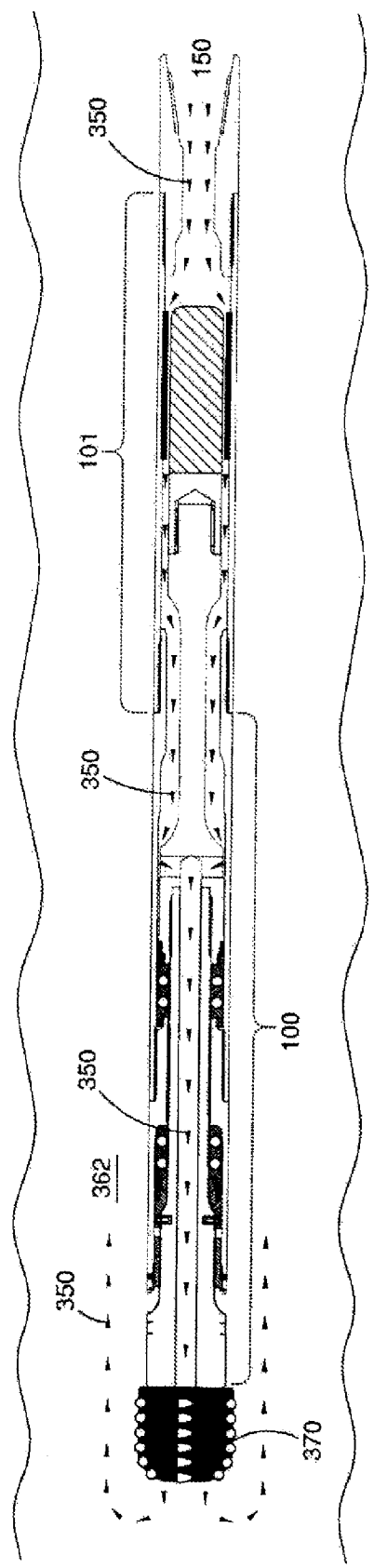
FIG. 6 is a cross-section illustrating the flow of drilling fluid down the drill string, through a downhole drilling motor, through the assembly of FIG. 3, out a bit and up the annulus of the wellbore.

Referring to both FIGS. 1 and 6, in operation, drilling fluid 350 (also known in the art as drilling mud) is pumped down the interior of a drill string attached to the downhole drilling motor 301. Drilling fluid 350 enters the drilling motor 301 having a pressure that is a combination of pressure imposed on the drilling fluid by pumps at the surface and the hydrostatic pressure of the above column of drilling fluid 350. The pressurized fluid entering a cavity in the motor, in cooperation with the lobes of the stator 306 and the geometry of the stator 306 and rotor 308 causes the lobes of the stator to deform and the rotor to turn to allow the drilling fluid 350 to pass through the motor 301. Drilling fluid 350 subsequently exits through ports (referred to in the art as jets) in drill bit 370 and travels up the annulus 362 between the bit 370, the assembly 100 of the present invention and the downhole motor assembly 301 and drill string 310, and is received at the surface 348 where it is captured and pumped down the drill string 310 again.

Referring to FIGS. 3 through 5D, therein is illustrated one embodiment of a downhole housing, mandrel and bearing assembly 100 of the present invention. The assembly has a torque transmission member (e.g. flex shaft 20) with an upper end 21 adapted to connect to a downhole motor power output 309. The flex shaft has a lower portion 27 with a longitudinal cavity 23, at least a portion of said cavity having female threads 24 and a lower end 25 having a male hex connector 26. It will be understood that other forms of connectors such as spline connectors, pins and threaded connectors may be used.

The assembly further includes a tubular mandrel 30 adapted at a lower end 31 to connect to a drill bit. The outer surface of the mandrel is generally cylindrical (except as noted herein) with an outer diameter that is smaller than the inner diameter of an upper housing 70 and a lower housing 60, allowing the mandrel to rotate in the housings. The mandrel has an upper portion 33 with an outer surface containing male threads 34 adapted to connect to the female threads 24 of the lower portion 27 of the flex shaft 20. The mandrel includes a longitudinal passage 32 through the mandrel from an upper end 35 to the lower end 31. A shoulder 37 is disposed between the upper portion 33 having a first outside diameter d1 and a lower portion 36 having a second outside diameter d2, wherein the second outside diameter d2 is greater than the first outside diameter d1. A series of flats (see FIGS. 5 and 5B) are disposed on the outer surface in the lower portion 36 of the mandrel 30 to form a male hex connector 38 upon which a catch assembly 110 is positioned. It will be understood that the series of flats may be six as in a hex connector or may be 2 or more flats that are sized and configured to mate with an interior surface of the catch assembly 110 and connect the mandrel to the catch assembly such that the catch assembly rotates with the mandrel during drilling operations, and does not rotate about the mandrel. It will be understood that other forms of connectors such as spline connectors, pins and threaded connectors may be used.

The assembly further includes a lower tubular housing 60 having a longitudinal passage 66 from an upper end 61 of the housing to a lower end 63 of the housing. The lower tubular housing includes an upper portion 65 having male threads 68 disposed on at least a portion of an external surface. A shoulder 67 is disposed between the upper portion 65 having a first inside diameter d3 and a lower portion 69 having a second inside diameter d4 wherein the second outside diameter d4 is greater than the first outside diameter d3. The upper end 61 further includes a male hex connector 62. It will be understood that the male connector may include a series of 6 flats as in a hex connection or may include two or more flats wherein the flats are configured to mate with a female connector of a bearing race member 87 to be joined to the male connector 62. It will be understood that other forms of connectors such as spline connectors, pins, and threaded connectors may be used.

The assembly further includes an upper tubular housing 70 having a longitudinal passage 76 from an upper end 71 of the housing to a lower end 73 of the housing. The passage has a lower portion 74 with an internal diameter adapted to receive an upper bearing assembly 80. The lower portion 74 of the internal passage 76 has female threads 75 disposed on at least a portion of an internal surface of the internal passageway, said threads adapted to connect to the male threads 68 of the upper portion of the lower tubular housing 60. The upper housing further includes an upper portion 77 adapted to connect to a stator 302 of a downhole drilling motor 301.

The assembly 100 further includes an upper bearing assembly 80 (see FIGS. 4 and 5) disposed in the internal passageway 76 of the upper housing 70, wherein the upper bearing assembly has at least three bearing race members each having a generally cylindrical body. An upper end race member 82 has an upper end having an upper female hex box connector 83 (see FIGS. 4C and 4D) adapted to receive the male hex connector 26 of the flex shaft 20 (see FIGS. 4A and 4B). The hex connector secures the upper race 82 to the flex shaft such that the upper race rotates with the flex shaft and with the mandrel 30 as the flex shaft and mandrel are rotated in drilling operations. It will be understood that other forms of connectors such as spline connectors, pins and threaded connectors may be used. A middle race member 86 is disposed below the upper race member 82 and separated by a plurality of thrust balls 85. The middle race section 86 is free to rotate with and about the mandrel during drilling operations. A lower end race member 87 is disposed below the middle race member 86. The lower race member has a lower end that includes a lower female hex box connector 89 that secures the lower race member to the male hex connector 62 at the upper end 61 of the lower tubular housing 60 (see FIGS. 4E and 4F). It will be understood that other forms of connectors such as spline connectors, pins and threaded connectors may be used. Therefore, the lower end race member 87 is fixed to the lower housing 60 and does not rotate with the mandrel 30. A plurality of thrust balls 85 are disposed between the middle race member 86 and the lower race member 87.

The assembly further includes a lower bearing assembly 90 disposed in the internal passageway 66 of the lower housing 60, wherein the bearing assembly has an upper race member 92 that is adapted to be received in the shoulder 67 of lower housing 60. Upper race member 92 may rotate about the mandrel during rotation of the mandrel during drilling operations. A middle race member 96 is disposed below the upper end race member 92 and separated by a plurality of thrust balls 95 (see FIGS. 5D and 5C). The middle race section 96 is free to rotate with and about the mandrel during drilling operations. A lower end race member 93 is disposed below the middle race member 96. The lower race member has a lower end that includes a lower female hex box connector 94 that secures the lower race member to a male hex connector 116 at the upper end of a catch assembly 110 (see FIGS. 5A and 5B). It will be understood that other forms of connectors such as spline connectors, pins and threaded connectors may be used. Therefore, the lower race member 93 is fixed to the catch assembly 110 and rotates with the mandrel 30. The catch assembly 110 is secured to the mandrel as described later herein. Therefore, the race member 93 rotates with the mandrel. A plurality of thrust balls 85 are disposed between the middle race member 96 and the lower race member 93 (see FIGS. 5C and 5D).

The assembly further includes an upper preload spring assembly 130 disposed in an exterior circumferential recess 29 in the lower portion 27 of the flex shaft 20. The spring assembly has a first resilient member 131 with a first end contacting a ledge 28 in recess 29 and a second end contacting a first end of a spacer member 132; and a second resilient member 133 with a first end contacting a second end of spacer member 132 and a second end contacting the upper end of the upper bearing assembly member 82.

The assembly further includes a lower preload spring assembly 140 disposed in an exterior circumferential recess 119 in catch sleeve 110. The spring assembly has a first resilient member 141 with a first end contacting a ledge 113 in recess 119 and a second end contacting a first end of a spacer member 142; and a second resilient member 143 with a first end contacting a second end of spacer member 142 and a second end contacting the lower end 97 of the lower bearing assembly 90.

The assembly further includes a radial sleeve 120 disposed in the lower end 63 of the lower housing 60. The radial sleeve 120 is locked within the lower housing by vertical dowel pin 124 that maintains the radial sleeve rotating with the lower housing around the mandrel during motor operation. The radial sleeve is held within the housing 60 with the retaining ring 122. This retaining ring 122 serves to hold the radial sleeve within housing 60 and extract the lower mandrel 30 and catch sleeve 110 in the event of a fracture within the upper section of the mandrel (see FIGS. 9A and 9B).

The assembly further includes a catch sleeve 110 having an internal passageway 112 adapted to contact the shoulder 37 of the tubular mandrel. The catch sleeve further includes an exterior surface adapted to be received in longitudinal passageway 66 of lower housing 60, and an upper end 115 having an upper male hex connector 116 adapted to receive the female hex connector 94 of the bearing 90. As illustrated in FIGS. 5, 5A and 5B, the tubular mandrel 30 has a portion of the exterior surface wherein the outer perimeter is configured as a hexagon in the portion of the mandrel on which the catch sleeve 110 is disposed. The catch sleeve passageway has an internal surface wherein the perimeter is configured as a hexagon adapted to mate with the outer surface of the tubular mandrel. It will be understood that other forms of connectors such as spline connectors, pins and threaded connectors may be used. When the catch sleeve 110 is in position the catch sleeve will move with the rotating mandrel during drilling operations, not about the mandrel. The assembly 100 further includes at least two radial receptacles 39 disposed in the lower portion 36 of the tubular mandrel, each of said receptacles is adapted to receive a locking pin 41. The pins secure the catch assembly to the mandrel.

The unique design of the assembly 100 provides many advantages over the prior art designs. For example, if the mandrel 30 were to break above the catch sleeve the mandrel can be removed from the wellbore 360 together with the upper 70 and lower 60 housings using the drill string 310. This configuration is desirable as it prevents the undesirable situation of leaving a portion of broken mandrel 30 and drill bit 370 in the wellbore, which must be retrieved in a difficult operation often referred to in the art as "fishing." Due to the unique configuration of the assembly of the present invention the broken mandrel 30 and drill bit 370 would be pulled from the wellbore using the drill string. Because of the configuration of the catch sleeve 110, the mandrel 30 and lower housing 60, the mandrel will not fall out of the lower housing 60 and be left in the wellbore 360.

Referring now to FIG. 7A, wherein the transfer of downward force DF through the assembly 100 to the bit 370 during drilling operations is illustrated. Downward force DF is transmitted through the upper housing 70 and lower housing 60 through the lower bearing 90 and catch sleeve 110 to the shoulder 37 of the mandrel 30 and through the mandrel to the bit 370. When pulling the drill string 310 from the hole, removal force RF is transferred through the upper bearing 80 to the flex shaft 20 which is connected to the mandrel 30, and through the mandrel 30 to the bit 370 (see FIG. 7B).

FIGS. 8A to 8K are partial cross-sections illustrating the sequential steps of assembling the housing, mandrel and bearing assembly of FIG. 3. In step 1, the mandrel 30, as illustrated in FIGS. 3, 4 and 5, and described above, is provided. A retaining ring 122 is slid downward from the top of the mandrel 30 until it rests on an outer radius of the bit box (See FIG. 8A).

Figure 8C:
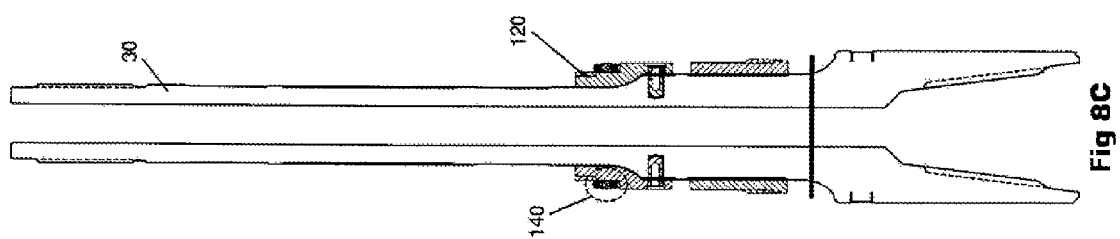
FIGS. 8A to 8K are partial cross-sections illustrating the sequential steps of assembling the housing, mandrel and bearing assembly of FIG. 3.
Figure 8B:
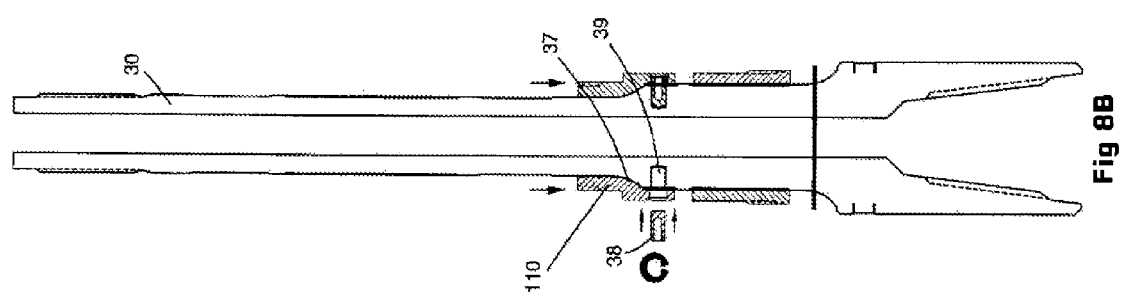
Figure 8A:
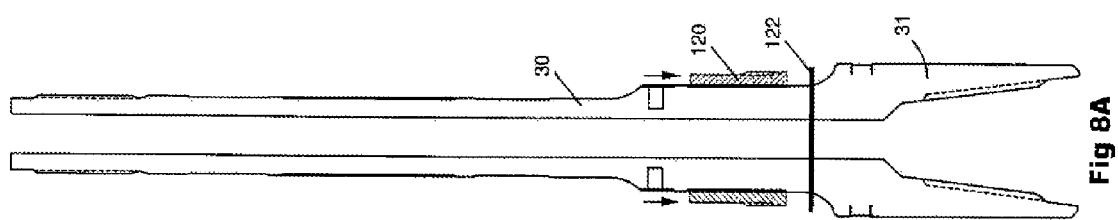
Figure 8F:
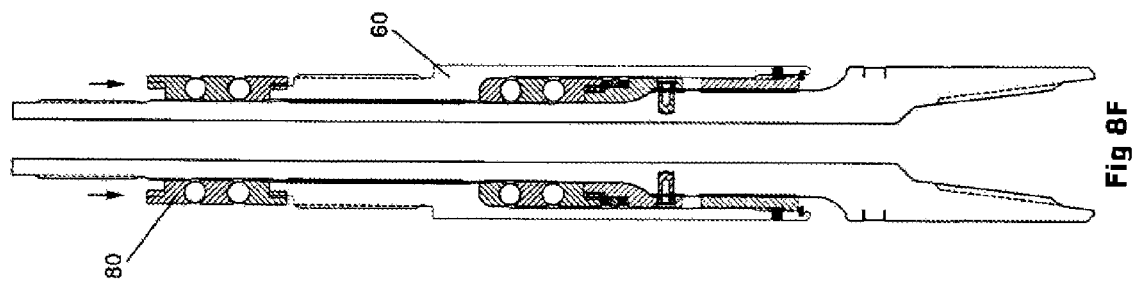
Figure 8E:
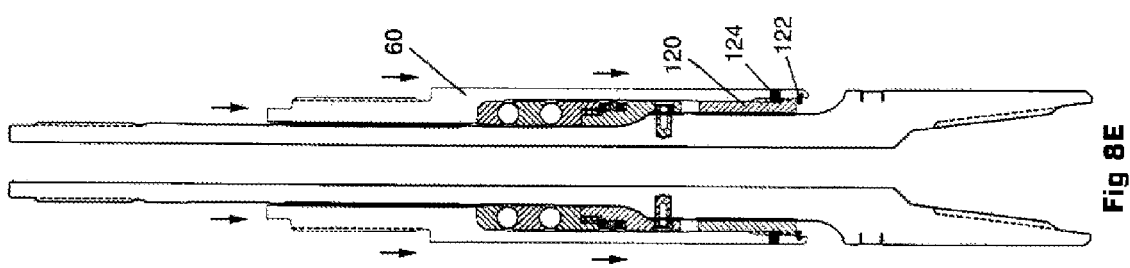
Figure 8D:
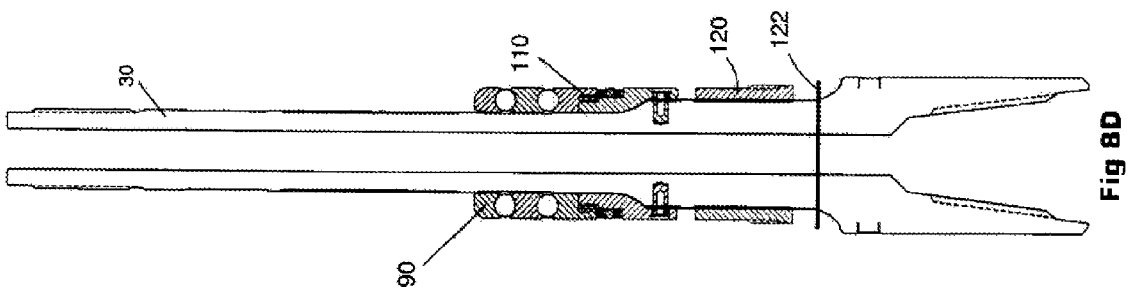
Figure 8G:
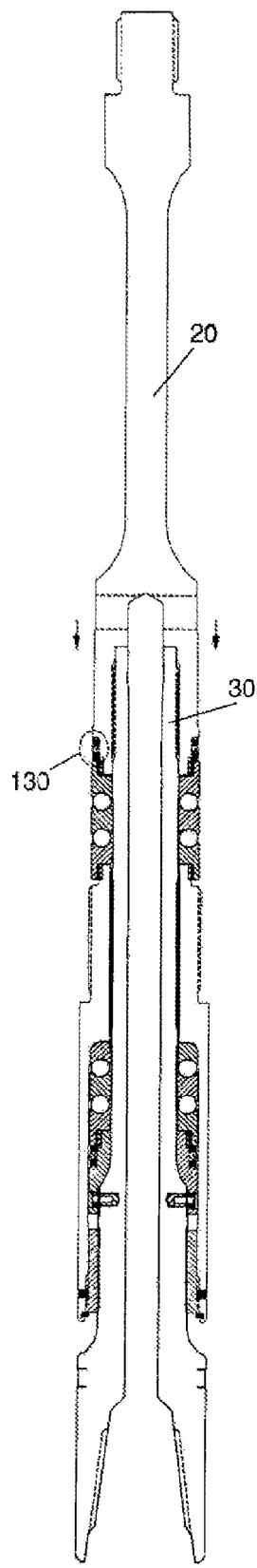
Figure 8H:
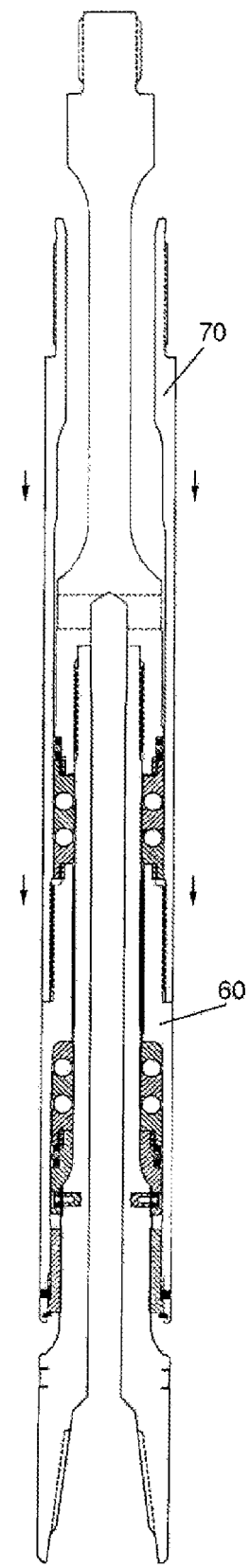
Figures 8I, 8J, 8K:
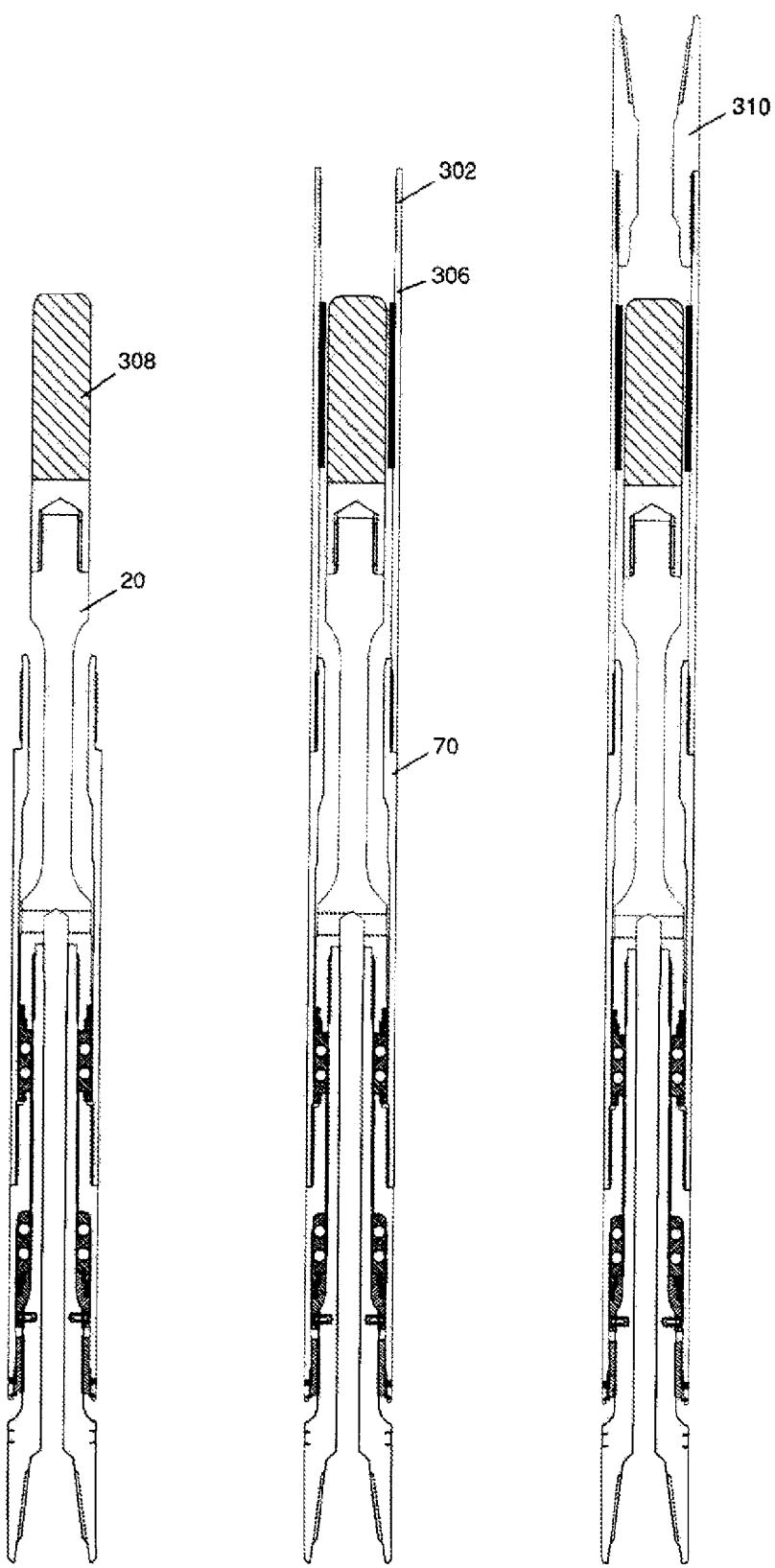

In step 2, a radial sleeve 120 is slid over the mandrel from the top until it rests on the retaining ring (see FIG. 8A).

In step 3 (see FIG. 8B), a catch sleeve 110 is slid over the top of the mandrel until the lower female hex connector is positioned over the male hex connector of the mandrel and the catch sleeve abuts the shoulder 37 of the mandrel.

In step 4 (see FIG. 8B), locking pins 41 are inserted into receptacles 39 in mandrel 30 to secure the catch sleeve to the mandrel.

In step 5 (see FIG. 8C), one or more lower preload spring assemblies 140 are inserted onto the catch sleeve and positioned in recess 119 of the catch assembly 110.

In step 6 (see FIG. 8D), lower bearing assembly 90 is slid over the mandrel and positioned on the top of catch sleeve 110.

In step 7 (see FIG. 8E), lower housing 60 is slid over the mandrel and positioned such that a ledge contacts the upper end of the lower bearing assembly. Retaining ring 122 is inserted into the lower end of the lower housing. The retaining ring 122 keeps the radial sleeve 120 from falling out the lower end of the housing 60.

In step 8 (see FIG. 8F), upper bearing assembly 80 is slid over the mandrel and positioned with the lower female hex connector of the bearing assembly onto the upper male hex connector of the lower housing.

In step 9 (see FIG. 8G), preload spring assembly 130 is slid over the mandrel and positioned adjacent the bearing assembly 80 to bias the bearing assembly members together and in contact with the housing 60.

In step 10 (see FIG. 8G), flex shaft 20 is positioned over the upper end of the mandrel and threadedly connected to the upper end of the mandrel.

In step 11 (see FIG. 8H), upper housing 70 is positioned over the flex shaft 20 and threadedly connected to lower housing 60.

In step 12 (see FIG. 8I), the power output 309 and rotor 308 of downhole motor 301 is connected to the flex shaft 20.

In step 13 (see FIG. 8J), the stator 306 and motor housing 302 is positioned over the rotor and upper end of the flex shaft.

In step 14 (see FIG. 8K), the upper end of motor housing 302 is connected to a cross-over sub that is connected to drill string 310.

Figure 10:
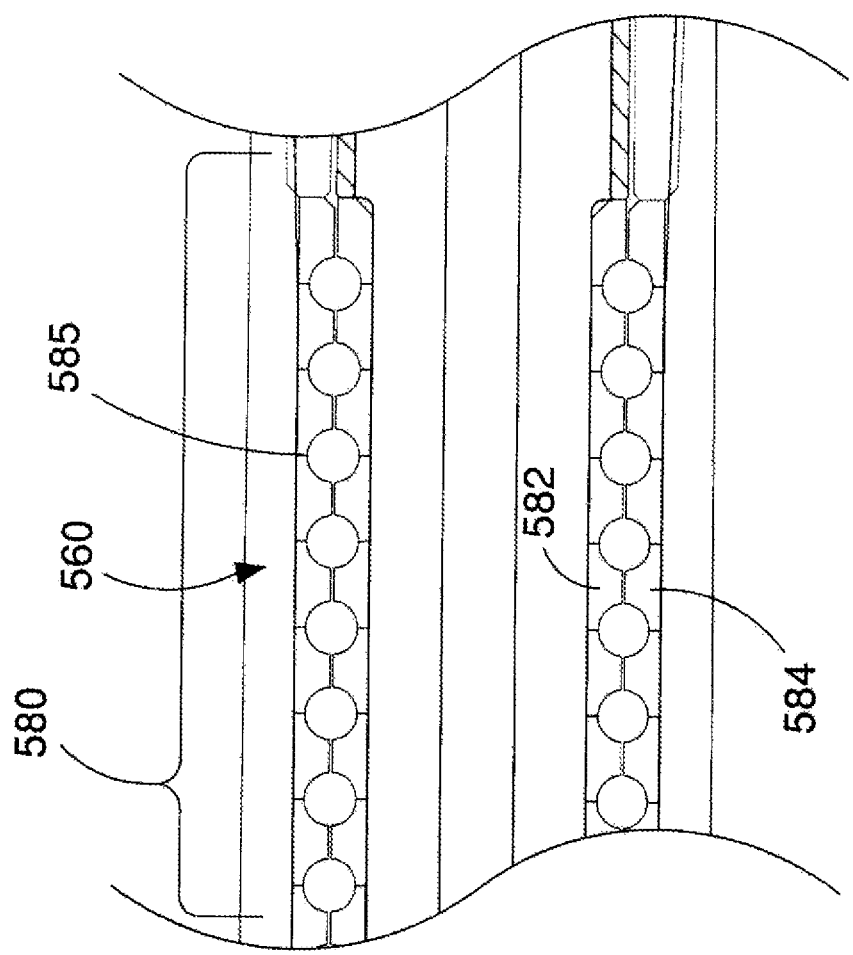
FIG. 10 is a cross-section of a prior art bearing used in a downhole motor.
Figure 11:
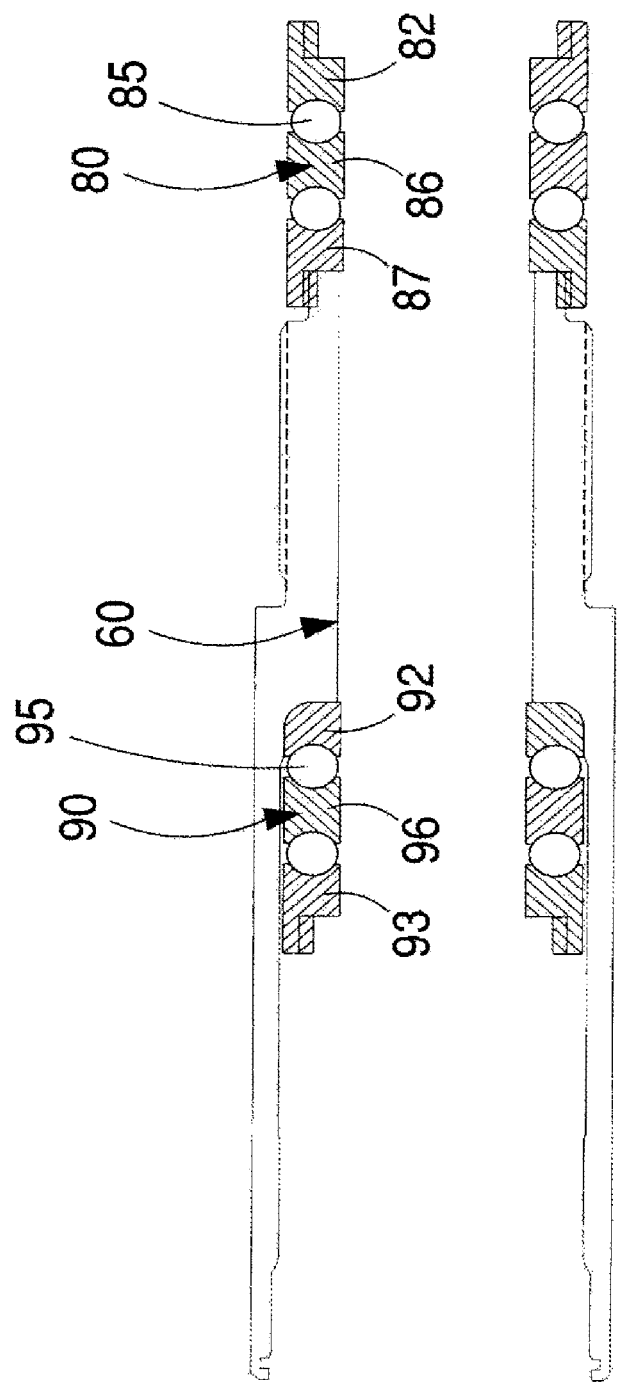
FIG. 11 is a cross-section of the upper housing and the upper and the lower bearing assemblies of the assembly of FIG. 3.

Referring to FIG. 10, wherein a cross-section of a prior art bearing system 580 inside housing 560 is illustrated. The bearing races are formed from an inside member 582 and an outside member 584. This assembly requires more machining and assembly time than the bearing assemblies 80 and 90 of the present invention (see FIG. 11). Bearing assemblies 80 and 90 are separated by housing 60.

Bearing races 82, 86, 87, 92, 96, and 93 are a single construction saving time and money in manufacturing an assembly when compared to prior art assembly 560.

It will be understood that threaded and hex connectors have been disclosed and described in the drawings and specifications; the present invention may use various types of connectors.

A number of embodiments of the invention have been described. Nevertheless, it will be understood that various modifications may be made without departing from the spirit and scope of the invention.

What is claimed is:

1. A housing, mandrel and bearing assembly comprising:
   a torque transmission member having:
      an upper end adapted to receive rotational torque power from a source of rotational torque,
      a lower portion with a longitudinal cavity with an open lower end, at least a portion of said cavity having an internal connector,
      a lower end having a connector;
   a tubular mandrel adapted at a lower end to connect to a drill bit, said tubular mandrel having:
      an upper portion of the tubular mandrel with an external surface including a connector adapted to connect to the internal connector in the longitudinal cavity of the torque transmission member,
      a longitudinal passage through the mandrel from an upper end to the lower end,
      a shoulder disposed on a portion of the external surface of the tubular mandrel between the upper portion of the tubular mandrel and a lower portion of the tubular mandrel, said upper portion having a first outside diameter d1 and said lower portion having a second outside diameter d2, wherein the second outside diameter d2 is greater than the first outside diameter d1;
   a lower tubular housing having:
      a longitudinal passage from an upper end of the lower tubular housing to a lower end of the lower tubular housing,
      an upper portion having a connector,
   an upper tubular housing having:
      a longitudinal passage from an upper end of the upper tubular housing to a lower end of the upper tubular housing,
      said longitudinal passage having a lower portion with an internal diameter adapted to receive an upper bearing,
      said lower portion of the longitudinal passage adapted to connect to the connector on the upper portion of the lower tubular housing;
   an upper bearing disposed in the longitudinal passage of the upper tubular housing contacting the lower end of the torque transmission member; and
   a lower bearing disposed on the tubular mandrel and contacting the lower housing.

2. The assembly of claim 1 wherein the lower tubular housing includes:
   a shoulder disposed between the upper portion of the lower tubular housing and a lower portion of the lower tubular housing, said upper portion having a first inside diameter d3 and said lower portion having a second inside diameter d4, wherein the second inside diameter d4 is greater than the first inside diameter d3; and
   the lower bearing is disposed in the longitudinal passage of the lower tubular housing contacting the shoulder of the lower tubular housing.

3. The assembly of claim 1 further including:
   an upper preload spring adapted to keep the upper bearing in compression, said spring comprising at least one resilient member.

4. The assembly of claim 1 further including:
   a lower preload spring adapted to keep the lower bearing in compression, said spring comprising at least one resilient member.

5. The assembly of claim 1 further including:
   a tubular catch sleeve disposed on a lower portion of the tubular mandrel, said tubular catch sleeve having:
      an internal passageway in the tubular catch sleeve adapted to contact the shoulder of the tubular mandrel;
      an exterior surface adapted to be received in the longitudinal passage of the lower housing;
      an upper end having a connector adapted to connect to the lower bearing; and
      a portion of the internal passageway in the tubular catch sleeve having a connector adapted to connect to a connector on a portion of the tubular mandrel.

6. The assembly of claim 5 further including:
   at least one radial receptacle disposed in the lower portion of the tubular mandrel, said receptacle adapted to receive a locking pin adapted to secure the tubular catch sleeve to the tubular mandrel.

7. The tubular catch sleeve of claim 5, wherein the connector in the internal passageway of the tubular catch sleeve is selected from the group consisting of hex, threaded, spline or pin connectors.

8. The assembly of claim 5 further including:
   a radial sleeve disposed in the lower end of the lower housing around the tubular mandrel;
   a retaining member that retains the radial sleeve in the lower tubular housing; and
   wherein an upper end of said radial sleeve is adapted to abut a lower end of the tubular catch sleeve when during drilling operations in a wellbore the tubular mandrel breaks into an upper and lower portion and the lower portion of the tubular mandrel is removed with the lower housing from the wellbore.

9. The assembly of claim 1, wherein the upper bearing comprises thrust bearing.

10. The assembly of claim 1, wherein the upper bearing comprises radial bearing.

11. The assembly of claim 1, wherein the upper bearing comprises at least an upper race member, a lower race member, and a plurality of thrust balls disposed there between, wherein the upper race member has an upper end adapted to contact the torque transmission member thereby securing the upper race to the torque transmission member such that the upper race member rotates with the torque transmission member when the torque transmission member and the tubular mandrel are rotated during drilling operations.

12. The upper bearing of claim 11, wherein the lower race member has a lower end adapted to contact an upper end of the lower tubular housing thereby securing the lower race to the lower tubular housing when the torque transmission member and the tubular mandrel are rotated during drilling operations.

13. The lower bearing of claim 5 comprises at least an upper race member, a lower race member, and a plurality of thrust balls disposed there between, wherein the lower race member of the lower bearing has a lower end that is adapted to contact the upper end of the catch assembly, thereby securing the lower race member to the tubular catch sleeve as the torque transmission member and the tubular mandrel are rotated during drilling operations.

14. The lower bearing of claim 13, wherein the upper race member of the lower bearing is adapted to contact a shoulder in the lower housing thereby securing the upper race member to the lower housing as the torque transmission member and the tubular mandrel are rotated during drilling operations.

15. A catch sleeve assembly for a bearing and mandrel assembly positionable in a wellbore, said catch sleeve assembly comprising:
 a tubular mandrel adapted at a lower end to connect to a drill bit, a shoulder disposed on a portion of an external surface of the tubular mandrel between an upper portion of the mandrel and a lower portion of the mandrel, said upper portion having a first outside diameter d1 and said lower portion having a second outside diameter d2, wherein the second outside diameter d2 is greater than the first outside diameter d1, said mandrel further including a longitudinal passage through the mandrel from an upper end to the lower end;
 a tubular housing having a longitudinal passage from an upper end of the tubular housing to a lower end of the tubular housing;
 a tubular catch sleeve having an exterior surface adapted to be received in the longitudinal passage of the tubular housing, said catch sleeve further having an internal passageway adapted to contact a shoulder of the tubular mandrel when the tubular catch sleeve is disposed on the tubular mandrel, and wherein a portion of the internal passageway has a connector adapted to connect to a connector on a portion of the tubular mandrel; and
 a radial sleeve disposed in the lower end of the tubular housing around the tubular mandrel, wherein an upper end of said radial sleeve is adapted to abut a lower end of the tubular catch sleeve when during drilling operations in a wellbore the tubular mandrel breaks into an upper and lower portion and the lower portion of the tubular mandrel is removed with the lower housing from the wellbore; and
 a retaining member that retains the radial sleeve in the tubular housing.

16. The tubular catch sleeve of claim 15, wherein the connector in the internal passageway is selected from the group consisting of hex, threaded, spline or pin connectors.

17. A housing, bearing and mandrel assembly positionable in a wellbore comprising:
 a lower tubular housing having:
  a longitudinal passage from an upper end of the housing to a lower end of the housing,
  an upper portion having a connector disposed on at least a portion of an external surface,
  a shoulder disposed between the upper portion of the housing and a lower portion of the housing, said upper portion having a first inside diameter d3 and said lower portion having a second inside diameter d4, wherein the second inside diameter d4 is greater than the first inside diameter d3;
 an upper tubular housing having:
  a longitudinal passage from an upper end of the housing to a lower end of the housing,
  said longitudinal passage having a lower portion with an internal diameter adapted to receive an upper bearing,
  said lower portion of the longitudinal passage having a connector disposed on at least a portion of an internal surface of the longitudinal passage, said connector adapted to connect to the connector of the upper portion of the lower tubular housing;
 a tubular mandrel disposed in the upper and lower housing, said tubular adapted at a lower end to connect to a drill bit, said tubular mandrel having:
  an upper portion of the tubular mandrel including a connector adapted to connect to source of rotational torque,
  a longitudinal passage through the mandrel from an upper end to the lower end,
  a shoulder disposed on a portion of the external surface of the tubular mandrel between the upper portion of the tubular mandrel and a lower portion of the tubular mandrel, said upper portion having a first outside diameter d1 and said lower portion having a second outside diameter d2, wherein the second outside diameter d2 is greater than the first outside diameter d1;
 an upper bearing disposed on the tubular mandrel in the longitudinal passage of the upper tubular housing; and
 a lower bearing disposed on the tubular mandrel in the longitudinal passage of the lower tubular housing.

18. The assembly of claim 17, wherein the upper bearing comprises thrust bearing.

19. The assembly of claim 17, wherein the upper bearing comprises radial bearing.

20. The assembly of claim 17, wherein the upper bearing comprises at least an upper race member, a lower race member, and a plurality of thrust balls disposed there between.

21. The assembly of claim 20, wherein the lower race member of the upper bearing has a lower end adapted to contact an upper end of the lower tubular housing member thereby securing the lower race to the lower tubular housing as the tubular mandrel is rotated during drilling operations.

22. The lower bearing of claim 17, wherein the lower bearing comprises at least an upper race member, a lower race member, and a plurality of thrust balls disposed there between, and wherein the upper race member of the lower bearing is adapted to contact the shoulder in the lower housing thereby securing the upper race member to the lower housing as the tubular mandrel is rotated during drilling operations.

23. The lower bearing of claim 22, wherein the lower race member of the lower bearing has a lower end that is adapted to contact the shoulder on the tubular mandrel thereby securing the lower race member to the tubular mandrel assembly as the tubular mandrel is rotated during drilling operations.

24. A method of assembling a drilling assembly comprising:
 providing a tubular mandrel having a bit box at a lower end adapted to connect to a drill bit, said tubular mandrel having an upper portion of the tubular mandrel having a connector adapted to connect a rotatable torque transmission member to a source of rotational torque, a shoulder disposed on a portion of the tubular mandrel between the upper portion of the tubular mandrel and a lower portion of the tubular mandrel;

sliding a radial sleeve over a top of the tubular mandrel and down over the mandrel until the radial sleeve is proximal to the upper end of the bit box;

sliding a tubular catch sleeve over the top of the tubular mandrel and down over the mandrel until a lower connector disposed in an internal passageway through the tubular catch sleeve is positioned over a connector of the mandrel and a portion of the tubular catch sleeve abuts the shoulder of the tubular mandrel;

securing the tubular catch sleeve to the tubular mandrel;

sliding a lower bearing over the tubular mandrel and positioning the lower bearing on a top of the tubular catch sleeve;

sliding a lower tubular housing over the tubular mandrel and positioning the lower tubular housing such that a shoulder of the lower tubular housing contacts the upper end of the lower bearing;

sliding an upper bearing over the mandrel and positioning the upper bearing in contact with the lower tubular housing;

positioning a longitudinal cavity disposed in a lower portion of a torque transmission member over the upper end of the tubular mandrel and connecting the torque transmission member to the upper end of the tubular mandrel; and positioning an upper tubular housing over the torque transmission member and connecting the upper tubular housing to the lower tubular housing.

25. The method of claim 24 further including:

before sliding the radial sleeve over the tubular mandrel, sliding a retaining member downwardly from the upper end of the tubular mandrel until it is proximal to an outer radius of the bit box at the lower end of the mandrel;

then sliding the radial sleeve over the tubular mandrel from the top until it is proximal to the retaining member; and inserting the retaining member into the lower end of the lower housing after sliding the lower tubular housing over the tubular mandrel and positioning the lower housing such that the shoulder of the lower tubular housing contacts the upper end of the lower bearing.

26. The method of claim 24 further including:

after sliding the lower tubular housing over the tubular mandrel, inserting a retaining member in a lower end of the lower tubular housing, said retaining member adapted to prevent the radial sleeve from sliding off a bottom end of the tubular mandrel and out the lower end of the lower tubular housing.

* * * * *